(12) United States Patent
    Liu

(10) Patent No.: US 11,632,581 B2
(45) Date of Patent: Apr. 18, 2023

(54) PLAYLIST SWITCHING METHOD, APPARATUS AND SYSTEM, TERMINAL AND STORAGE MEDIUM

(71) Applicant: BEIJING BYTEDANCE NETWORK TECHNOLOGY CO., LTD., Beijing (CN)

(72) Inventor: Deping Liu, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/491,532

(22) Filed: Oct. 1, 2021

(65) Prior Publication Data
    US 2022/0021922 A1    Jan. 20, 2022

Related U.S. Application Data

(63) Continuation of application No. PCT/CN2020/074270, filed on Feb. 4, 2020.

(30) Foreign Application Priority Data

May 20, 2019 (CN) .......................... 201910419142.4

(51) Int. Cl.
    *G10H 1/36*       (2006.01)
    *H04N 21/262*     (2011.01)
    (Continued)

(52) U.S. Cl.
    CPC ..... *H04N 21/26258* (2013.01); *G06F 16/683* (2019.01); *G06F 16/687* (2019.01); *H04N 21/233* (2013.01); *G10H 1/365* (2013.01)

(58) Field of Classification Search
    CPC ............. G10H 2220/011; G10H 1/365; G10H 2240/175; G10H 2220/145;
    (Continued)

(56) References Cited

U.S. PATENT DOCUMENTS

2004/0243482 A1* 12/2004 Laut ................... G06Q 30/0601
                                                              705/26.1
2015/0254242 A1   9/2015 Cirrincione et al.
2018/0288467 A1* 10/2018 Holmberg .......... H04N 21/4302

FOREIGN PATENT DOCUMENTS

CN       101938628 A      1/2011
CN       101990112 A      3/2011
(Continued)

OTHER PUBLICATIONS

Chinese Patent Application No. 201910419142.4, Notice of Allowance dated Dec. 1, 2020, 2 pages.
(Continued)

*Primary Examiner* — Thomas H Maung

(57) ABSTRACT

Embodiments of the present disclosure disclose a playlist switching method, apparatus and system, a terminal and a storage medium. The method includes: generating a playlist switching request according to a trigger operation of a creator of a singing room, and sending the playlist switching request to a service, where the playlist switching request includes a target playlist identification and a singing room identification after switching (S110); and in case of receiving switching success information, displaying playlist information corresponding to the target playlist identification on a display interface (S120).

15 Claims, 3 Drawing Sheets

Generating a playlist switching request according to a trigger operation of a creator of a singing room, and sending the playlist switching request to a server, where the playlist switching request includes a target playlist identification and a singing room identification after switching — S110

In a case of receiving switching success information, displaying playlist information corresponding to the target playlist identification on a display interface — S120

(51) Int. Cl.
*G06F 16/687* (2019.01)
*G06F 16/683* (2019.01)
*H04N 21/233* (2011.01)

(58) Field of Classification Search
CPC ....... G10H 2240/125; G10H 2240/131; H04N 21/6125; H04N 21/48
See application file for complete search history.

(56) References Cited

FOREIGN PATENT DOCUMENTS

| | | |
|---|---|---|
| CN | 103312783 A | 9/2013 |
| CN | 104168271 A | 11/2014 |
| CN | 104820689 A | 8/2015 |
| CN | 106210755 A | 12/2016 |
| CN | 106231349 A | 12/2016 |
| CN | 106257928 A | 12/2016 |
| CN | 106488331 A | 3/2017 |
| CN | 106531201 A | 3/2017 |
| CN | 106534944 A | 3/2017 |
| CN | 106686396 A | 5/2017 |
| CN | 107204913 A | 9/2017 |
| CN | 107396137 A | 11/2017 |
| CN | 109257631 A | 1/2019 |
| CN | 109445577 A | 3/2019 |
| CN | 109640190 A | 4/2019 |
| CN | 110109597 A | 8/2019 |
| WO | 02/096026 A1 | 11/2002 |

OTHER PUBLICATIONS

Chinese Patent Application No. 201910419142.4, First Office Action dated Jun. 30, 2020, 9 pages.
Author: Unknown (2016) "Analysis of the changes in information dissemination caused by mobile pan-life live broadcasts" Sep. 5, 2016 [online] website: http: //www.ocn.com.cn/reports/1980wangluozhibo.shtml, pp. 117-119, with English Abstract.
Cho et al. (2017) "Real-time interactive AR system for broadcasting" IEEE Virtual Reality (VR) Conference, Mar. 18-22, 2017, Los Angeles, California, Abstract Only.
Extended European Search Report dated Apr. 4, 2022 in European Patent Application No. 20809804.6.
Hepenstal et al., "Algorithmic Transparency of Conversational Agents," Joint Proceedings of the ACM IUI 2019 Workshops, Mar. 20, 2019 (Mar. 20, 2019), pp. 1-11, XP055904759, Retrieved from the Internet: URL:http://ceur-ws.org/Vol-2327/IUI19WS-IU IATEC-1.pdf [retrieved on Mar. 23, 2022].

* cited by examiner

PLAYLIST SWITCHING METHOD, APPARATUS AND SYSTEM, TERMINAL AND STORAGE MEDIUM

CROSS-REFERENCE TO RELATED APPLICATIONS

This application is a continuation of International Application No. PCT/CN2020/074270, filed on Feb. 4, 2020, which claims priority to Chinese patent application No. 201910419142.4, filed to the China National Intellectual Property Administration on May 20, 2019. The disclosures of the aforementioned applications are hereby incorporated by reference in their entireties.

TECHNICAL FIELD

Embodiments of the present disclosure relate to Internet technology, for example, to a playlist switching method, apparatus and system, a terminal and a storage medium.

BACKGROUND

With the rapid development of Internet technology, a variety of short video applications have been developed, which greatly enrich people's daily life and meet people's growing entertainment needs.

Some short video applications have singing functions. For example, after a homeowner selects a playlist (such as a nostalgic playlist for 70s), a singing room can be created and other team members can be invited to join the room, so that singings are performed based on songs in the playlist selected by the homeowner in the singing room.

However, in the related art, when the homeowner or team member does not want to sing the songs in a selected playlist, the selected playlist cannot be switched, therefore, there is an urgent need for an implementation that can switch the playlist.

SUMMARY

The embodiments of the present disclosure provide a playlist switching method, apparatus and system, a terminal and a storage medium, so as to realize real-time switching of playlists and improve user experience.

In an embodiment, the embodiment of the present disclosure provides a playlist switching method applied to a client terminal, including:

generating a playlist switching request according to a trigger operation of a creator of a singing room, and sending the playlist switching request to a server, where the playlist switching request includes a target playlist identification and a singing room identification after switching; and in case of receiving switching success information, displaying playlist information corresponding to the target playlist identification on a display interface.

In an embodiment, the embodiment of the present disclosure further provides a playlist switching method applied to a server, including:

receiving a playlist switching request, and obtaining a target playlist identification and a singing room identification in the playlist switching request; and switching a stored room playlist identification corresponding to the singing room identification to the target playlist identification, generating switching success information, and returning the switching success information.

In an embodiment, the embodiment of the present disclosure further provides a playlist switching apparatus, including:

a playlist switching request sending module, configured to generate a playlist switching request according to a trigger operation of a creator of a singing room, and send the playlist switching request to the server, where the playlist switching request includes a target playlist identification and a singing room identification after switching; and a playlist information displaying module, configured to display playlist information corresponding to the target playlist identification on a display interface in case of receiving switching success information.

In an embodiment, the embodiment of the present disclosure further provides a playlist switching apparatus, including:

a playlist switching request receiving module, configured to receive a playlist switching request, and obtain a target playlist identification and a singing room identification in the playlist switching request; and a playlist switching module, configured to switch a stored room playlist identification corresponding to the singing room identification to the target playlist identification, generate switching success information, and return the switching success information.

In an embodiment, the embodiment of the present disclosure further provides a playlist switching system, where the system includes: a client and a server;

where the client is configured to implement the playlist switching method applied to the client side as provided in the embodiment of the present disclosure; and the server is configured to implement the playlist switching method applied to the server side as provided in the embodiment of the present disclosure.

In an embodiment, the embodiment of the present disclosure further provides a terminal device, the device including:

one or more processors;

a memory, configured to store one or more programs; and the one or more programs are executed by the one or more processors to cause the one or more processors to implement the playlist switching method as provided in any embodiment of the present disclosure.

In an embodiment, the embodiment of the present disclosure further provides a computer-readable storage medium, where a computer program is stored on the computer-readable storage medium, and the computer program, when executed by the processor, implements the playlist switching method as provided by any embodiment of the present disclosure.

DETAILED DESCRIPTION OF EMBODIMENTS

The technical solutions of the present disclosure will be described below through embodiments with reference to drawings in the embodiments of the present disclosure. The described embodiments are a part of the embodiments of the present disclosure, rather than all the embodiments. In the following multiple embodiments, each embodiment provides both optional features and examples. Multiple features recorded in the embodiments can be combined to form multiple optional solutions, and each numbered embodiment should not be merely regarded as a technical solution.

Embodiment 1

Figure 1:
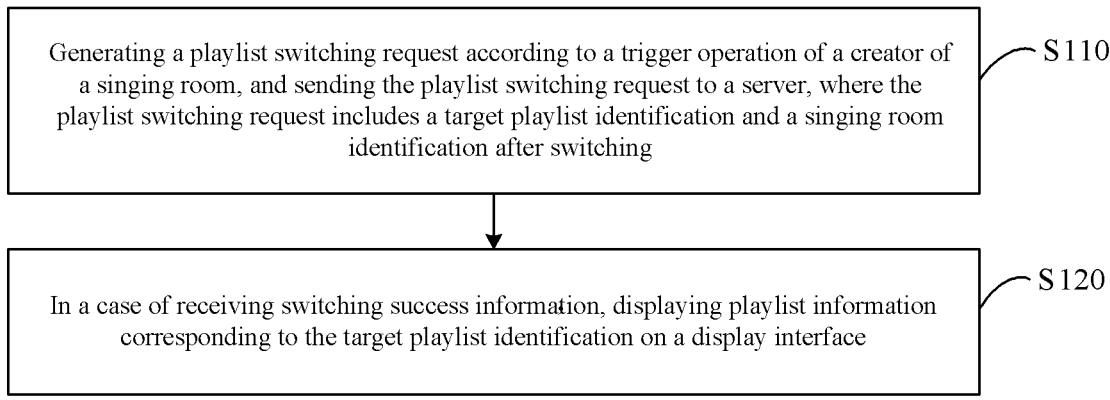
FIG. 1 is a flowchart of a playlist switching method provided by Embodiment 1 of the present disclosure.

FIG. 1 is a flowchart of a playlist switching method provided by Embodiment 1 of the present disclosure. The embodiment may be applicable to a situation where a current playlist of a singing room is switched. The method can be executed by a playlist switching apparatus provided on the client, and the apparatus can be implemented by software and/or hardware and integrated in a terminal device with a singing function, such as a smart phone, a tablet computer, etc. The method includes the following steps:

S110: generating a playlist switching request according to a trigger operation of a creator of a singing room, and sending the playlist switching request to a server, where the playlist switching request includes a target playlist identification and a singing room identification after switching.

Where the creator of the singing room may refer to a user who creates the singing room. The creator of the singing room can invite other users to join the singing room after creating a certain singing room, or the system automatically matches other users to join the singing room. Exemplarily, the creator of the singing room can be regarded as the homeowner of the singing room; and other users who join the singing room can be participants of the singing room, that is, the team members of the singing room. For a certain singing room, there can be one creator and multiple participants, and a number of the participants can be preset based on business scenarios and actual situations. Any user in the embodiment can become a creator of a certain singing room, or can also become participants of a certain singing room.

Where trigger operation of the creator may refer to, but is not limited to, click operation, slide operation, and touch operation of the creator. Exemplarily, the trigger operation may be clicking an icon corresponding to a certain playlist. The playlist switching request may refer to a request for switching the playlist currently selected by the creator. The playlist identification may be, but is not limited to, at least one of Chinese characters, letters, numbers, symbols, and graphics, so as to distinguish different playlists. Exemplarily, in the embodiment, a name of the playlist may be used as playlist identification, such as: nostalgic 70s, classic 80s, trendy 90s, and so on. The target playlist identification may refer to the identification corresponding to the playlist after switching. The identification of the singing room may be, but is not limited to, at least one of Chinese characters, letters, numbers, symbols, and graphics, so as to distinguish different singing rooms.

In an embodiment, when the creator of the singing room creates the singing room, a playlist is selected firstly so as to create the singing room based on a selected playlist, so that the user can sing the songs of the playlist in the singing room. When the creator or the participants of the singing room does not want to sing the song in the currently selected playlist, the creator of the singing room can perform a trigger operation in the display interface based on the target playlist that he wants to sing. When the client used by the creator detects the trigger operation of the creator, it is indicated that the creator has the need to switch the current playlist. At this time, the playlist switching request can be generated according to the target playlist identification and the singing room identification, and the playlist switching request can be sent to the server. When the server receives the playlist switching request, the playlist switching request can be analyzed to obtain the target playlist identification and the singing room identification in the playlist switching request, switch the current playlist identification corresponding to the singing room identification to the target playlist identification, generate switching success information after switching, and can send the switching success information to the client used by the creator.

S120: in case of receiving switching success information, displaying playlist information corresponding to the target playlist identification on a display interface.

Where the playlist information corresponding to the target playlist identification may include song names, lyrics, and singer information in the target playlist.

In an embodiment, when the client used by the creator receives the switching success information sent by the server, it is indicated that the server has switched the playlist currently selected by the creator, at this time, the current playlist information displayed in the display interface can be switched to the playlist information corresponding to the target playlist identification, that is, the playlist information corresponding to the target playlist identification is displayed on the display interface of the client used by the creator, so that the creator can sing the songs in the target playlist after switching, thereby realizing a switching function of the playlist.

In an embodiment, the client used by the creator may pre-store the playlist information corresponding to each playlist, so that the playlist information corresponding to the target playlist identification can be quickly obtained, thereby improving playlist switching speed, and improving user experience.

According to the technical solution of the embodiment of the present disclosure, when the creator of the singing room wants to switch the playlist, the client used by the creator can generate a playlist switching request according to the creator's trigger operation, and send the playlist switching request to the server, the server performs playlist switching based on the target playlist identification after switching and the singing room identification in the playlist switching request, and returns the switching success information after the switching is successful. When the client used by the creator receives the switching success information sent by the server, the playlist information corresponding to the target playlist identification is displayed on the display interface, so that real-time switching of the selected playlist can be realized based on the trigger operation of the creator, which greatly improves the user experience.

On the basis of the above technical solution, the method further includes: if it is detected that a playlist query event corresponding to the participants of the singing room is triggered, sending a playlist query request to the server, so that the server detects whether there is situation of a playlist switching in the singing room based on the playlist query request, and returns detection result information, where the playlist query request includes the singing room identification and the current playlist identification; and if it is determined that the playlist has been switched according to the detection result information, then obtaining the target playlist identification after switching from the detection result information, and displaying the playlist information corresponding to the target playlist identification on the display interface. Where the playlist query event corresponding to the participants in the singing room may refer to an event generated in the client used by the participants in the singing room to query the current playlist in the singing room. The playlist query request may be sent to the server to query the current playlist in the singing room. The current playlist identification may refer to the identification of the playlist selected in the singing room at the current moment in the client used by the participants. The detection result information may be the information that the playlist has been switched or the information that the playlist has not been switched, where the information that the playlist has been switched may also include the target playlist identification after switching.

In an embodiment, when the client used by the participants in the singing room detects that the playlist query event is triggered, it can generate a playlist query request based on the singing room identification and the current playlist identification, and send the playlist query request to the server. The server analyzes a received playlist query request to obtains the singing room identification and the current playlist identification, and detects whether the playlist identification corresponding to the singing room identification is the current playlist identification, so as to determine whether there is a situation of playlist switching in the singing room, and sends a detection result to the client used by the participants. If the client used by the participants determines that the playlist has been switched according to the received detection result information, that is, the detection result information is that the playlist has been switched, the target playlist identification after switching can be obtained from the detection result information, and the current playlist information displayed in the display interface is switched to the playlist information corresponding to the target playlist identification. That is, the playlist information corresponding to the target playlist identification is displayed on the display interface of the client used by the participants, so that the participants can also sing the songs in the switched target playlist. That is, the creator and participants of the same singing room can sing based on the switched target playlist, thereby realizing synchronized switching of the playlist.

In an embodiment, the creator of the singing room in the embodiment has authority to switch the playlist, while the participants in the singing room does not have the authority to switch the playlist, so as to prevent a chaotic situation due to switching the playlist by the creator and the participants at the same time.

On the basis of the above technical solution, the if it is detected that the playlist query event corresponding to the participants in the singing room is triggered, sending the playlist query request to the server may include: periodically sending the playlist query request to the server based on a preset time interval; or, when detecting the trigger operation by a participant in the singing room, sending a playlist query request to the server.

Where the trigger operation of the participant in the singing room may refer to, but is not limited to, a click operation, a slide operation, and a touch operation of the participant.

In an embodiment, after the singing room is created, when the creator and the participants agree to switch the current playlist to the target playlist, the participants can execute a trigger operation on the client used by the participants. When the client used by the participants detects the trigger operation, a playlist query request can be generated based on the singing room identification and the current playlist identification, and the playlist query request can be sent to the server, so that the playlist query and switching functions can be realized based on the participants' trigger operation.

In an embodiment, after a singing room is created, the client used by the participants can actively trigger the playlist query event periodically based on a preset time interval, so that the client used by the participants can periodically and actively send a playlist query request to the server without waiting for the participants' trigger operation, so as to avoid the situation that the participants forget to perform the trigger operation which causes the playlist in the client used by the participants cannot be switched in real time. In the embodiment, the playlist is switched by the client actively sending a request to the server without establishing a long connection between the client and the server, thereby greatly saving system resources and improving operating efficiency.

Based on the above technical solution, before generating the playlist switching request according to the trigger operation of the creator of the singing room, the method further includes: determining the target playlist identification after switching based on a preset chat function in the singing room.

The singing room of the embodiment may be set with a preset chat function, so that the creator and participants can communicate in text or voice through the preset chat function, and quickly obtain the target playlist after multiple users agree to switch, thus the target playlist identification corresponding to the target playlist can be quickly determined, and the switching efficiency can be improved.

Embodiment 2

Figure 2:
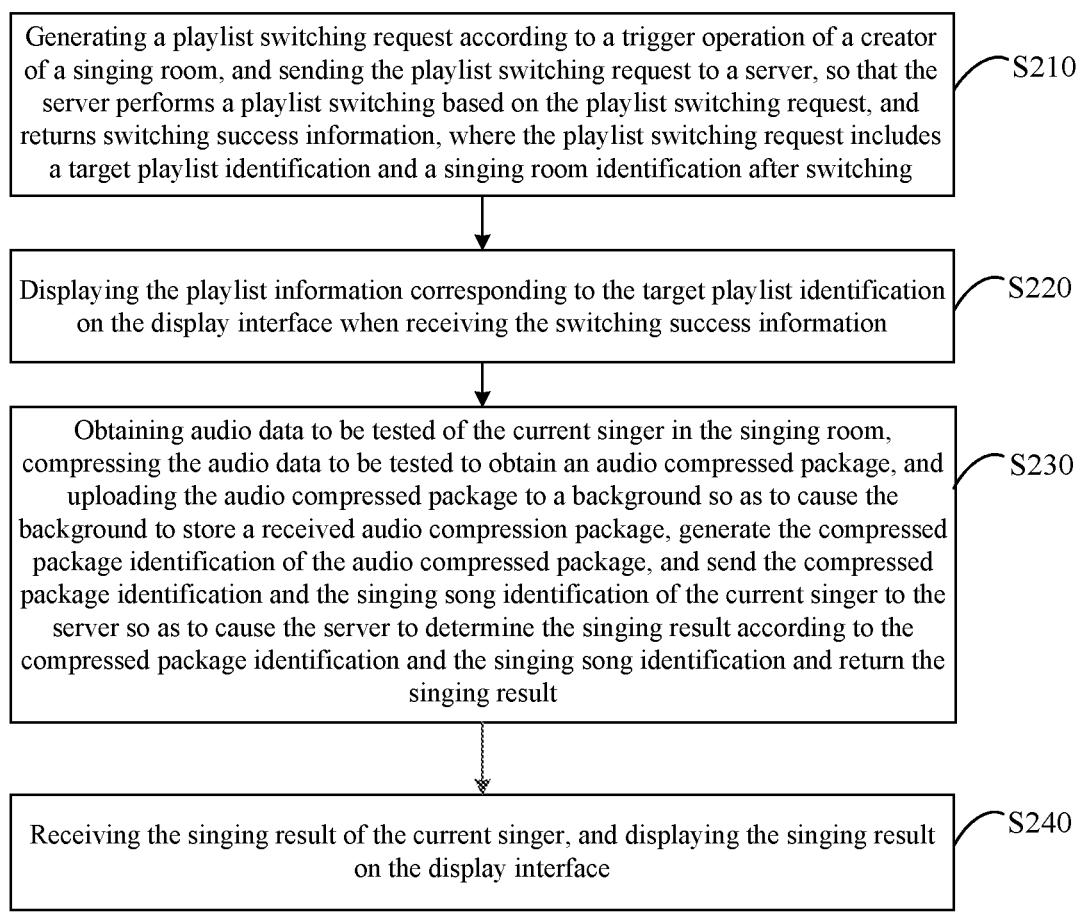
FIG. 2 is a flowchart of a playlist switching method provided by Embodiment 2 of the present disclosure.

FIG. 2 is a flowchart of a playlist switching method provided by Embodiment 2 of the present disclosure. On the basis of the above-mentioned embodiment, the embodiment describes the determination of the singing result of the current singer in the singing room in detail. Where the explanations of terms that are the same as or corresponding to those in the above-mentioned embodiment will not be repeated here.

Refer to FIG. 2, the playlist switching method provided in the embodiment includes the following steps:

S210: generating a playlist switching request according to a trigger operation of a creator of a singing room, and sending the playlist switching request to a server, so that the server performs a playlist switching based on the playlist switching request and returns switching success information, where the playlist switching request includes a target playlist identification and a singing room identification after switching;

S220: displaying the playlist information corresponding to the target playlist identification on the display interface when receiving the switching success information; and S230: obtaining audio data to be tested of the current singer in the singing room, compressing the audio data to be tested to obtain an audio compressed package, and uploading the audio compressed package to a background so as to cause the background to store a received audio compression package, generate the compressed package identification of the audio compressed package, and send the compressed package identification and the singing song identification of the current singer to the server so as to cause the server to determine the singing result according to the compressed package identification and the singing song identification and return the singing result.

Where the current singer in the singing room may refer to a user who is singing a song in the singing room at the current moment, and may be the creator or any participant in the singing room. In the singing room, the user can determine the singer of each song in the current playlist by grabbing a microphone. The background in the embodiment may refer to background server, which is configured to store audio data to be tested of the signer, so that other servers can quickly obtain the audio data to be tested of the signer by accessing the background, thereby realizing a data sharing function. The compressed package identification may refer to, but is not limited to, at least one of Chinese characters, letters, numbers, symbols, and graphics, so as to distinguish different audio compressed packages. The singing song identification may refer to, but is not limited to, at least one of Chinese characters, letters, numbers, symbols, and graphics, so as to distinguish different singing songs in the current playlist. Exemplarily, the name of the singing song may be used as the singing song identification. The singing result may include singing success and singing failure.

In an embodiment, the audio data to be tested of the current singer can be obtained through a recording function on the client used by the current singer. The client used by the current singer can compress obtained audio data to be tested to obtain an audio compression package, and upload the audio compression package to the background. The background stores received audio compression package, generates corresponding compression package identification for stored audio compression package, and sends the compression package identification and the singing song identification of the current singer to the server. The server can obtain the corresponding audio compression package from the background based on the received compression package identification, and analyze the audio compression package to obtain the audio data to be tested. According to the singing song identification of the current singer, the standard audio data corresponding to the current song sung by the current singer can be determined, and the audio data to be tested and the standard audio data can be identified and compared, so that the singing result of the current singer can be determined, and the singing result can be returned to the client used by each user in the singing room.

S240: receiving the singing result of the current singer and displaying the singing result on the display interface.

In an embodiment, when the client receives the singing result sent by the server, the singing result can be displayed on the display interface of the client, so that the user using the client can see the singing result of the song currently sung.

The embodiment does not limit the execution sequence when executing S230-S240. For example, S230-S240 can be executed sequentially after S220; or S230-S240 can also be executed before S210.

In the technical solution of the embodiment, an audio compression package is obtained by compressing the audio data to be tested of the current singer in the singing room, and the audio compression package is uploaded to the background. The background can store the received audio compression package to generate a compressed package identification of the audio compressed package, and send the compressed package identification and the singing song identification of the current singer to the server. The server can determine the singing result according to the compressed package identification and the singing song identification, and return the singing result. The singing result of the current singer is received by the client, and the singing result is displayed on the display interface, so that each user in the singing room can quickly see the singing result of the current singer.

On the basis of the above technical solution, the method may further include: determining, when receiving the uploading failure information, that the singing result of the current singer is singing success, and displaying the singing success information on the display interface, where the uploading failure information is the information sent by the background when it is detected that the audio compression package fails to upload.

In an embodiment, in the process of uploading the obtained audio compression package to the background by the client used by the current singer, if the background detects that the complete audio compression package has not been received, that is, the audio compression package fails to upload, the background can send the uploading failure information to the client used by each user in the singing room. When the client receives the uploading failure information, it is indicated that the audio compression package fails to upload due to a system failure or an abnormal network connection, etc., rather than the user's singing. Therefore, it can directly determine that the singing result of the current singer is singing success, and display the singing success information on the display interface to avoid reducing the user's singing experience. Exemplarily, when the background detects that the audio compression package fails to upload, the upload failure reminder information can be generated and displayed, so as to promptly remind the relevant technical personnel to perform fault checking, and can also count the upload failure rate of the audio compression package so that the system performance can be evaluated and improved based on the upload failure rate.

Embodiment 3

Figure 3:
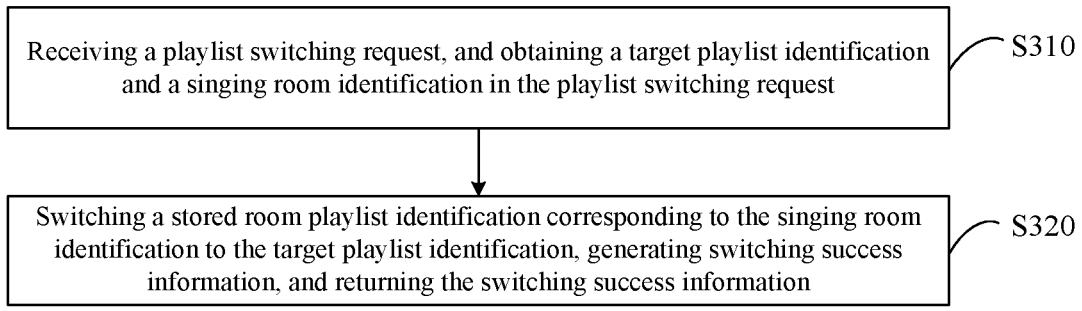
FIG. 3 is a flowchart of a playlist switching method provided by Embodiment 3 of the present disclosure.

FIG. 3 is a flowchart of a playlist switching method provided in the Embodiment 3 of the present disclosure. The embodiment may be applicable to a situation where the current playlist of a singing room is switched. The method can be executed by a playlist switching apparatus provided on the server, and the apparatus may be implemented by software and/or hardware, and integrated into the server. As shown in FIG. 3, the method includes the following steps:

S310: receiving a playlist switching request, and obtaining a target playlist identification and a singing room identification in the playlist switching request.

Where the playlist identification may be, but is not limited to, at least one of Chinese characters, letters, numbers, symbols, and graphics, so as to distinguish different playlists. Exemplarily, in the embodiment, the name of the playlist may be used as the playlist identification, such as: nostalgic 70s, classic 80s, trendy 90s, and so on. The target playlist identification may refer to the identification corresponding to the playlist after switching. The identification of the singing room may be, but is not limited to, at least one of Chinese characters, letters, numbers, symbols, and graphics, so as to distinguish different singing rooms.

In an embodiment, when receiving the playlist switching request sent by the client used by the creator of the singing room, the server analyzes the playlist switching request to obtain the target playlist identification and the singing room identification in the playlist switching request.

S320: switching a stored room playlist identification corresponding to the singing room identification to the target playlist identification, generating switching success information, and returning the switching success information.

In an embodiment, after the creator of the singing room creates the singing room based on a selected playlist, the client used by the creator may send the created singing room identification and the selected current playlist identification to the server. The server establishes a corresponding relationship between the received singing room identification and the current playlist identification, and stores the corresponding relationship. When the server obtains the target playlist identification and the singing room identification sent by the client, the room playlist identification corresponding to the received singing room identification can be determined based on a pre-stored corresponding relationship, and the determined room playlist identification is updated to the target playlist identification to update the stored corresponding relationship, so that the playlist identification corresponding to the singing room identification is the target playlist identification, thereby realizing the playlist switching operation on the server. After the server switches the room playlist identification corresponding to the singing room identification to the target playlist identification, the switching success information can be generated, and the switching success information can be sent to the client used by the creator, so that when the client receives switching success information, the playlist information corresponding to the target playlist identification is displayed on the display interface, thereby realizing the playlist switching operation on the client.

According to the technical solution of the embodiment of the present disclosure, when the creator of the singing room wants to switch the playlist, the client used by the creator can generate a playlist switching request according to the creator's trigger operation, and send the playlist switching request to the server. The server switches the room playlist identification corresponding to the stored singing room identification to the target playlist identification based on the target playlist identification and singing room identification in the playlist switching request, and returns the switching success information after the switching is successful. When the client used by the creator receives the switching success information sent by the server, the playlist information corresponding to the target playlist identification is displayed on the display interface, so that real-time switching of the selected playlist can be realized based on the trigger operation of the creator, which greatly improves the user experience.

Based on the above technical solution, the method may further includes: receiving a playlist query request, and obtaining the singing room identification and the current playlist identification in the playlist query request; determining, according to the corresponding relationship between the room identification and the playlist identification and the singing room identification, the room playlist identification corresponding to the singing room identification; and if it is detected that the current playlist identification is different from the room playlist identification, determining that the playlist has been switched, generating detection result information based on the target playlist identification, and returning the detection result information.

Where the playlist query request may refer to a request sent by the client used by the participants in the singing room to the server to perform a query request on the current playlist of the singing room. The current playlist identification may refer to the identification of the playlist selected in the singing room at the current moment in the client used by the participants. The detection result information may be the information that the playlist has been switched or the information that the playlist has not been switched, where the information that the playlist has been switched may also include the target playlist identification after switching.

In an embodiment, when the client used by the participants in the singing room detects that the playlist query event is triggered, a playlist query request can be generated based on the singing room identification and the current playlist identification, and the playlist query request can be sent to the server. The server analyzes the received playlist query request, obtains the singing room identification and the current playlist identification, and obtains the stored corresponding relationship between the room identification and the playlist identification from a local database. Based on the corresponding relationship, the room playlist identification corresponding to the singing room identification can be determined. The server detects whether the room playlist identification is the current playlist identification, if not, it is indicated that the current playlist has been switched in the client where the creator is located, at this time, it can be determined that the detection result information is that the playlist has been switched, and the detection result information is generated according to the target playlist identification, that is, the room playlist identification corresponding to the singing room identification determined based on the corresponding relationship; and if yes, it is indicated that the current playlist has not been switched in the client where the creator is located, and at this time, it can be determined that the detection result information is the information that playlist has not been switched. The server sends the detection result information to the client used by the participants. If the client used by the participants determines that the playlist has been switched according to the received detection result information, that is, the detection result information is that the playlist has been switched, the target playlist identification after switching can be obtained from the detection result information, and the playlist information corresponding to the target playlist identification is displayed on the display interface of the client used by the participants, so that the participants can also sing the songs in the target playlist after switching, that is, both the creator and the participants of the same singing room can sing based on the target playlist after switching, thereby realizing the synchronous switching of the playlist.

In the embodiment, after the creator of the singing room switches the current playlist to the target playlist, the client where the participants in the singing room is located can also send a playlist query request to the server, thereby switching the current playlist in the client where the participant is located to the target playlist. Therefore, the synchronous switching of the playlist can be realized, so that both the creator and the participants can grab the microphone and sing based on the target playlist.

On the basis of the above technical solution, the method further includes: receiving a compressed package identification and the singing song identification of the current singer sent by the background, where the compressed package identification is generated by the background based on the stored audio compressed package; obtaining an audio compression package corresponding to the compression package identification in the background, and analyzing the audio compression package to obtain the audio data to be tested; obtaining standard audio data corresponding to the singing song identification from the local database; and performing content recognition on the audio data to be tested and the standard audio data, determining the singing result of the creator, and returning the singing result.

Where the current singer may refer to a user who is singing a song in the singing room at the current moment, and may be the creator or any participant in the singing room. In the singing room, the user can determine the singer of each song in the current playlist by grabbing a microphone. The background in the embodiment may refer to background server, which is configured to store audio data to be tested of the signer, so that other servers can quickly obtain the audio data to be tested of the signer by accessing the background, thereby realizing a data sharing function. The compressed package identification may refer to, but is not limited to, at least one of Chinese characters, letters, numbers, symbols, and graphics, so as to distinguish different audio compressed packages. The singing song identification may refer to, but is not limited to, at least one of Chinese characters, letters, numbers, symbols, and graphics, so as to distinguish different singing songs in the current playlist. Exemplarily, the name of the singing song may be used as the singing song identification. The singing result may include singing success and singing failure.

In an embodiment, the server may obtain the corresponding audio compression package from the background based on the received compression package identification, and analyze the audio compression package to obtain the audio data to be tested. The standard audio data corresponding to the current song sung by the current singer can be obtained from the local database based on the received song identification. The server performs automatic content recognition (Automatic Content Recognition, ACR) on the audio data to be tested and the standard audio data. According to the degree of data matching between the two, the singing result of the current singer can be determined, such as when the degree of data matching between the audio data to be tested and the standard audio data is higher than a preset value, it can be determined that the singing result is singing success; otherwise, it is determined that the singing result is singing failure. When determining the singing result of the current singer, the server can return the singing result to the client used by each user in the singing room, so that each user in the singing room can promptly see the singing result of the current singing.

Embodiment 4

Figure 4:
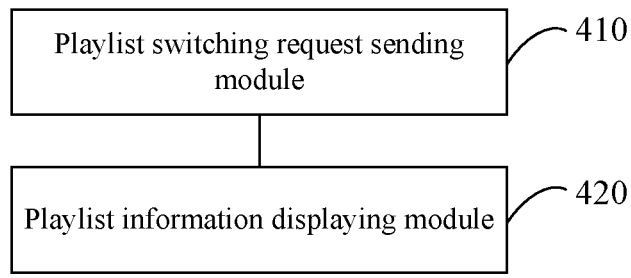
FIG. 4 is a schematic structural diagram of a playlist switching apparatus provided by Embodiment 4 of the present disclosure.

FIG. 4 is a schematic structural diagram of a playlist switching apparatus provided by the Embodiment 4 of the present disclosure. The embodiment may be applicable for the situation of switching a current playlist in a singing room. The apparatus may include: a playlist switching request sending module 410 and a playlist information displaying module 420.

Where the playlist switching request sending module 410 is configured to generate a playlist switching request according to a trigger operation of the creator of a singing room, and send a playlist switching request to a server, so that the server performs the playlist switching based on the playlist switching request, and returns switching success information. Where the playlist switching request includes a target playlist identification and a singing room identification after switching; and the playlist information displaying module 420 is configured to display the playlist information corresponding to the target playlist identification on the display interface when receiving the switching success information.

Optionally, the apparatus further includes:
a playlist query request sending module, configured to, if it is detected that a playlist query event corresponding to the participants in the singing room is triggered, send a playlist query request to the server, so that the server detects whether there is a situation of playlist switching in the singing room based on the playlist query request, and returns detection result information, where the playlist query request includes a singing room identification and a current playlist identification; and
the playlist information displaying module 420, further configured to, if it is determined that the playlist has been switched according to the detection result information, obtain the target playlist identification after switching from the detection result information, and display the playlist information corresponding to the target playlist identification on the display interface.

Optionally, the playlist query request sending module is configured to: periodically send the playlist query request to the server based on a preset time interval; or, when detecting the trigger operation by a participant in the singing room, send a playlist query request to the server.

Optionally, the apparatus further includes:
a target playlist identification determining module, configured to determine the target playlist identification after switching based on the preset chat function in the singing room before generating the playlist switching request according to the trigger operation of the creator of the singing room.

Optionally, the apparatus further includes:
an audio compression package uploading module, configured to obtain audio data to be tested of the current singer in the singing room, compress the audio data to be tested to obtain an audio compression package, and upload the audio compression package to a background, so as to cause the background to store the received audio compressed package, generate a compressed package identification of the audio compressed package, and send the compressed package identification and the singing song identification of the current singer to the server, so as to cause the server to determine the singing result according to the compressed package identification and the singing song identification, and return the singing result; and
a singing result displaying module, configured to receive the singing result of the current singer and display the singing result on the display interface.

Optionally, the apparatus further includes:
a singing result displaying module, further configured to determine that the singing result of the current singer is singing success when the uploading failure information is received, and display the singing success information on the display interface, where the uploading failure information the information sent by the background when it is detected that the audio compression package fails to upload.

The playlist switching apparatus provided in the embodiment of the present disclosure can execute the playlist switching methods provided in Embodiment 1 and Embodiment 2 of the present disclosure, and has the corresponding functional modules and effects for executing the playlist switching methods.

Embodiment 5

Figure 5:
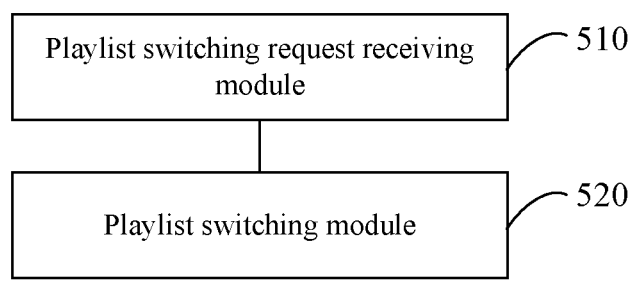
FIG. 5 is a schematic structural diagram of a playlist switching apparatus provided by Embodiment 5 of the present disclosure.

FIG. 5 is a schematic structural diagram of a playlist switching apparatus provided by Embodiment 5 of the present disclosure. The embodiment is applicable to a situation where the current playlist of the singing room is switched. The apparatus may include: a playlist switching request receiving module 510 and a playlist switching module 520.

Where the playlist switching request receiving module 510 is configured to receive the playlist switching request, and obtain a target playlist identification and a singing room identification in the playlist switching request; and the playlist switching module 520 is configured to switch a stored room playlist identification corresponding to the singing room identification to the target playlist identification, generate switching success information, and return the switching success information.

Optionally, the apparatus further includes:

a playlist querying request receiving module, configured to receive a playlist query request, and obtain the singing room identification and a current playlist identification in the playlist query request;

a room playlist identification determining module, configured to determine a room playlist identification corresponding to the singing room identification according to the corresponding relationship between the room identification and the playlist identification and the singing room identification; and a detection result information returning module, configured to, if it is detected that the current playlist identification is different from the room playlist identification, determine that the playlist has been switched, generate detection result information based on the target playlist identification, and return the detection result information.

Optionally, the apparatus further includes:

a compressed package identification receiving module, configured to receive a compressed package identification and a song identification of a current singer sent by the background, where the compressed package identification is generated by the background based on a stored audio compressed package;

an audio compression package analyzing module, configured to obtain an audio compression package corresponding to the compression package identification from the background, and analyze the audio compression package to obtain audio data to be tested;

a standard audio data obtaining module, configured to obtain standard audio data corresponding to a singing song identification from the local database; and a singing result returning module, configured to perform content recognition on the audio data to be tested and the standard audio data, determine a singing result of the creator, and return the singing result.

The playlist switching apparatus provided in the embodiment of the present disclosure can execute the playlist switching method provided in the Embodiment 3 of the present disclosure, and has the corresponding functional modules and effects for executing the playlist switching method.

Embodiment 6

Figure 6:
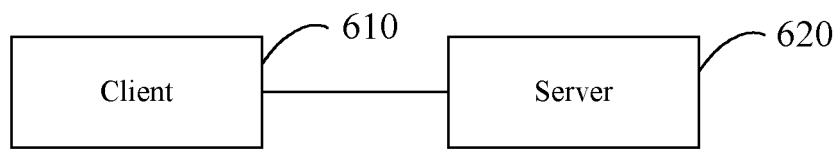
FIG. 6 is a schematic structural diagram of a playlist switching system provided by Embodiment 6 of the present disclosure.

FIG. 6 is a schematic structural diagram of a playlist switching system provided by Embodiment 6 of the present disclosure. Refer to FIG. 6, the playlist switching system includes: a client 610 and a server 620;

where the client 610 may be configured to execute the playlist switching method provided in Embodiment 1 or Embodiment 2 of the present disclosure, and the server 620 may be configured to execute the playlist switching method provided in the Embodiment 3 of the present disclosure.

In the playlist switching system in the embodiment of the present disclosure, when a creator of the singing room wants to switch a playlist, the client 610 used by the creator can generate a playlist switching request according to a trigger operation of the creator, and send the playlist switching request to the server 620. The server 620 performs a playlist switching based on a target playlist identification and a singing room identification after switching in the playlist switching request, and returns switching success information after the switching is successful. When the client 610 used by the creator receives the switching success information sent by the server 620, playlist information corresponding to the target playlist identification is displayed on a display interface, so that a real-time switching of a selected playlist can be realized based on the trigger operation of the creator, which greatly improves the user experience.

Embodiment 7

Figure 7:
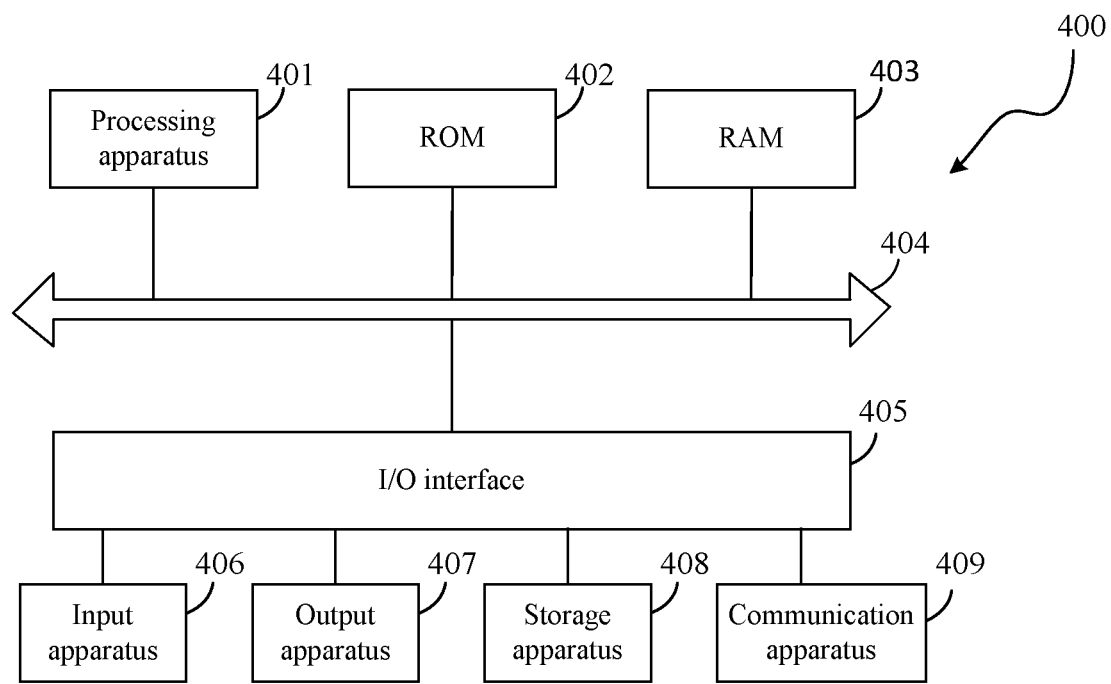
FIG. 7 is a schematic structural diagram of a terminal device provided by Embodiment 7 of the present disclosure.

FIG. 7 shows a schematic structural diagram of a terminal device provided by Embodiment 7 of the present disclosure. The terminal device in the embodiment of the present disclosure may include mobile terminals such as a mobile phone, a notebook computer, a digital broadcast receiver, a personal digital assistant (Personal Digital Assistant, PDA), a portable android device (Portable Android Device, PAD), a portable media player (Portable Multimedia Player, PMP), and an in-vehicle terminal (for example, an in-vehicle navigation terminal), and fixed terminals such as a digital television (Television, TV) and a desktop computer, etc. The terminal device shown in FIG. 7 is merely an example.

As shown in FIG. 7, the terminal device 400 may include a processing apparatus (such as a central processor, a graphics processor, etc.) 401 which may execute various appropriate actions and processing according to a program stored in a read-only memory (Read-Only Memory, ROM) 402 or a program loaded from a storage apparatus 408 to a random access memory (Random Access Memory, RAM) 403. In the RAM 403, various programs and data required for the operation of the terminal device 400 are also stored. The processing apparatus 401, the ROM 402, and the RAM 403 are connected to each other through a bus 404. An input/output (Input/Output, I/O) interface 405 is also connected to the bus 404.

Generally, the following apparatuses can be connected to the I/O interface 405: an input apparatus 406 including, such as, a touch screen, a touch pad, a keyboard, a mouse, a camera, a microphone, an accelerometer, and/or a gyroscope; an output apparatus 407 including, such as, a liquid crystal display (Liquid Crystal Display, LCD), a speaker and/or a vibrator; a storage apparatus 408 including, such as, a magnetic tape and/or a hard disk; and a communication apparatus 409. The communication apparatus 409 may allow the terminal device 400 to perform wireless or wired communication with other devices to exchange data. Although FIG. 7 shows the terminal device 400 having multiple apparatuses, it should be understood that it is not required to implement or have all the illustrated apparatuses. Alternatively, more or fewer apparatuses may be implemented or provided.

According to an embodiment of the present disclosure, the process described above with reference to the flowchart may be implemented as a computer software program. For example, an embodiment of the present disclosure includes a computer program product which includes a computer program carried on a computer-readable medium, and the computer program contains a program code for executing the method shown in the flowchart. In such an embodiment, the computer program may be downloaded and installed from the network through the communication apparatus 409, or installed from the storage apparatus 408, or installed from the ROM 402. When the computer program is executed by the processing apparatus 401, the above-mentioned functions defined in the method of the embodiment of the present disclosure are executed.

The device proposed in the embodiment of the present disclosure and the playlist switching methods proposed in the above embodiments belong to a same concept. For technical details that are not described in the embodiments in detail, please refer to the above embodiments, and the present embodiment has the same effect for performing the playlist switching method.

Embodiment 8

Embodiment 8 of the present disclosure provides a computer storage medium on which a computer program is stored, and the program, when executed by a processor, implements the playlist switching method provided by any of the above embodiments.

The above-mentioned computer storage medium of the present disclosure may be a computer-readable signal medium or a computer-readable storage medium, or a combination of the two above. The computer-readable storage medium may be, for example, but not limited to, an electrical, a magnetic, an optical, an electromagnetic, an infrared, or a semiconductor system, an apparatus or a device, or any combination of the above. The computer-readable storage medium may include: an electrical connection with one or more wires, a portable computer disk, a hard disk, a RAM, a ROM, an erasable programmable read-only memory (Erasable Programmable Read-Only Memory, EPROM) or a flash (FLASH), an optical fiber, a portable compact disc read-only memory (Compact Disc Read-Only Memory, CD-ROM), an optical storage device, a magnetic storage device, or any suitable combination of the above. In the present disclosure, the computer-readable storage medium may be a variety of tangible media containing or storing a program, and the program may be used by or in combination with an instruction execution system, an apparatus, or a device. In the present disclosure, the computer-readable signal medium may include a data signal propagated in a baseband or as a part of a carrier wave, and a computer-readable program code is carried therein. The propagated data signal can adopt many forms, including an electromagnetic signal, an optical signal, or any suitable combination of the above. The computer-readable signal medium may also be a variety of computer-readable media other than the computer-readable storage medium, and the computer-readable signal medium may send, propagate or transmit a program for use by or in combination with the instruction execution system, the apparatus, or the device. The program code contained on the computer-readable medium can be transmitted using a variety of suitable media, including: wire, optical cable, radio frequency (Radio Frequency, RF), etc., or any suitable combination of the above.

The above-mentioned computer storage may be included in the above-mentioned terminal device; or it may exist separately without being assembled into the terminal device.

The above-mentioned computer stores and carries one or more programs. The above-mentioned one or more programs, when executed by the terminal device, cause the terminal device to: generate a playlist switching request according to a trigger operation of a creator of a singing room, and send the playlist switching request to the server, where the playlist switching request includes a target playlist identification and a singing room identification after switching; and in case of receiving switching success information, display playlist information corresponding to the target playlist identification on a display interface.

The computer program code configured to perform the operations of the present disclosure can be written in one or more programming languages or a combination thereof. The above-mentioned programming languages include object-oriented programming languages—such as Java, Smalltalk, C++, and also conventional procedural programming languages—such as "C" language or similar programming languages. The program code can be executed entirely on the user's computer, executed partly on the user's computer, executed as an independent software package, executed partly on a user's computer and executed partly on a remote computer, or executed entirely on a remote computer or a server. In the situation related to the remote computer, the remote computer can be connected to the user's computer through any kind of network including a local area network (Local Area Network, LAN) or a wide area network (Wide Area Network, WAN), or it can be connected to an external computer (for example, using an Internet service provider to connect via the Internet).

The flowcharts and block diagrams in the drawings illustrate the possible implementation of the system architecture, functions, and operations of the system, the method, and the computer program product according to various embodiments of the present disclosure. In this regard, each block in the flowchart or block diagram may represent a module, a program segment, or part of a code, and the module, the program segment, or the part of the code contains one or more executable instructions for realizing a specified logic function. In some alternative implementations, the functions marked in the block may also occur in an order different from that marked in the drawings. For example, two blocks shown in succession can actually be executed substantially in parallel, and they can sometimes be executed in a reverse order, depending on the functions involved. Each block in the block diagram and/or the flowchart and the combination of the blocks in the block diagram and/or the flowchart can be implemented by a dedicated hardware-based system that performs the specified functions or operations, or can be implemented by a combination of a dedicated hardware and computer instructions.

The units involved in the embodiments described in the present disclosure may be implemented in a software manner, and may also be implemented in a hardware manner. Where a name of the unit does not constitute a limitation on the unit itself under a certain circumstance. For example, the first playlist switching request sending module can also be described as "configured to generate a playlist switching request according to a triggering operation of a creator of a singing room, and send the playlist switching request to a server".

What is claimed is:

1. A playlist switching method, applied to a client of an application, comprising:

generating a playlist switching request according to a trigger operation of a creator of a singing room, and sending the playlist switching request to a server, wherein the playlist switching request comprises a target playlist identification and a singing room identification after switching, wherein the singing room is created based on a selected playlist by the creator in the client of the application, so that singing is performed by the creator or a participant based on a song in the playlist in the singing room, and the selected playlist has a selected playlist identification, the selected playlist identification and the singing room identification are used to establish a corresponding relationship between the singing room identification and the selected playlist identification by the server, and corresponding relationship is stored by the server;

when receiving switching success information, displaying playlist information corresponding to the target playlist identification on a display interface;

when detecting that a playlist query event corresponding to a participant in the singing room is triggered, sending a playlist query request to the server, wherein the playlist query request comprises the singing room identification and a current playlist identification, wherein the creator has authority to switch a playlist, and the participant does not have the authority to switch the playlist;

when determining a playlist has been switched according to the detection result information, obtaining the target playlist identification after switching from the detection result information, and displaying the playlist information corresponding to the target playlist identification on a display interface; and before generating the playlist switching request according to the trigger operation of the creator of the singing room, the method further comprising:

determining the target playlist identification after switching based on a communication between the creator and at least one participant in the singing room via a preset chat function in the singing room.

2. The method according to claim 1, wherein the when detecting that the playlist query event corresponding to the participant in the singing room is triggered, sending the playlist query request to the server comprises:

periodically sending the playlist query request to the server based on a preset time interval; or, when detecting the trigger operation of the participant in the singing room, sending the playlist query request to the server.

3. The method according to claim 1, further comprising:
obtaining audio data to be tested of a current singer in the singing room, compressing the audio data to be tested to obtain an audio compression package, and uploading the audio compression package to a background; and
receiving a singing result of the current singer, and displaying the singing result on the display interface.

4. The method according to claim 1, further comprising:
obtaining audio data to be tested of a current singer in the singing room, compressing the audio data to be tested to obtain an audio compression package, and uploading the audio compression package to a background; and
receiving a singing result of the current singer, and displaying the singing result on the display interface.

5. The method according to claim 2, further comprising:
obtaining audio data to be tested of a current singer in the singing room, compressing the audio data to be tested to obtain an audio compression package, and uploading the audio compression package to a background; and
receiving a singing result of the current singer, and displaying the singing result on the display interface.

6. The method according to claim 1, further comprising:
obtaining audio data to be tested of a current singer in the singing room, compressing the audio data to be tested to obtain an audio compression package, and uploading the audio compression package to a background; and receiving a singing result of the current singer, and displaying the singing result on the display interface.

7. The method according to claim 3, further comprising:
when receiving upload failure information, determining that the singing result of the current singer is singing success, and displaying singing success information on the display interface, wherein the uploading failure information is information sent by the background when detecting that the audio compression package fails to upload.

8. A playlist switching method, applied to a server of an application, comprising:

receiving a playlist switching request sent by a client of the application used by a creator of a singing room, and obtaining a target playlist identification and a singing room identification in the playlist switching request, wherein the singing room is created based on a selected playlist by the creator in the client of the application, so that singing is performed by the creator or a participant based on a song in the playlist in the singing room, the selected playlist has a selected playlist identification, and wherein the target playlist identification is determined based on a communication between the creator and at least one participant in the singing room via a preset chat function in the singing room;

establishing, using the selected playlist identification and the singing room identification, a corresponding relationship between the singing room identification and the selected playlist identification; and storing the corresponding relationship;

switching a stored room playlist identification corresponding to the singing room identification to the target playlist identification, generating switching success information, and returning the switching success information;

receiving a playlist query request sent by a client used by a participant in the singing room, and obtaining the singing room identification and a current playlist identification in the playlist query request; wherein the creator has authority to switch a playlist, and the participant does not have the authority to switch the playlist;

determining a room playlist identification corresponding to the singing room identification according to the singing room identification and a corresponding relationship between the singing room identification and a playlist identification; and when detecting that the current playlist identification is different from the room playlist identification, determining that the playlist has been switched, generating detection result information based on the target playlist identification, and returning the detection result information.

9. The method according to claim 8, further comprising:
receiving a compressed package identification and a song identification of a current singer sent by the background, wherein the compressed package identification is generated by the background based on a stored audio compressed package;

obtaining an audio compression package corresponding to the compression package identification from the background, and analyzing the audio compression package to obtain audio data to be tested;

obtaining standard audio data corresponding to singing song identification from a local database; and performing content recognition on the audio data to be tested and the standard audio data, determining a singing result of the creator, and returning the singing result.

10. The method according to claim 8, further comprising:

receiving a compressed package identification and a song identification of a current singer sent by the background, wherein the compressed package identification is generated by the background based on a stored audio compressed package;

obtaining an audio compression package corresponding to the compression package identification from the background, and analyzing the audio compression package to obtain audio data to be tested;

obtaining standard audio data corresponding to singing song identification from a local database; and performing content recognition on the audio data to be tested and the standard audio data, determining a singing result of the creator, and returning the singing result.

11. A playlist switching apparatus, comprising:

one or more processors;

a communication interface connected with the one or more processors; and a memory, configured to store one or more programs, and connected with the one or more processors; wherein instructions, when executed by the one or more processors, cause the one or more processors to:

receive, through the communication interface, a playlist switching request sent by a client of an application used by a creator of a singing room, and obtain a target playlist identification and a singing room identification in the playlist switching request, wherein the singing room is created based on a selected playlist by the creator in the client of the application, so that singing is performed by the creator or a participant based on a song in the playlist in the singing room, the selected playlist has a selected playlist identification, and wherein the target playlist identification is determined based on a communication between the creator and at least one participant in the singing room via a preset chat function in the singing room;

establish, using the selected playlist identification and the singing room identification, a corresponding relationship between the singing room identification and the selected playlist identification; and store the corresponding relationship;

switch, through the communication interface, a stored room playlist identification corresponding to the singing room identification to the target playlist identification, generate switching success information, and return the switching success information;

receive, through the communication interface, a playlist query request sent by a client used by a participant in the singing room, and obtain the singing room identification and a current playlist identification in the playlist query request; wherein the creator has authority to switch a playlist, and the participant does not have the authority to switch the playlist;

determine the room playlist identification corresponding to the singing room identification according to the singing room identification and a corresponding relationship between the room identification and the playlist identification; and when detecting that the current playlist identification is different from the room playlist identification, determine that the playlist has been switched, generate detection result information based on the target playlist identification, and return the detection result information.

12. A playlist switching system, comprising: a client and a server;

wherein the client is configured to implement the following steps:

generating a playlist switching request according to a trigger operation of a creator of a singing room, and sending the playlist switching request to the server, wherein the playlist switching request comprises a target playlist identification and a singing room identification after switching; and when receiving the switching success information, displaying playlist information corresponding to the target playlist identification on a display interface; and the server is configured to implement the method according to claim 8.

13. A non-transitory computer-readable storage medium, wherein a computer program is stored on the computer-readable storage medium, and the computer program, when executed by a processor, implements the method according to claim 1.

14. The non-transitory computer-readable storage medium according to claim 13, wherein the computer program, when executed by a processor, further implements the following steps:

periodically sending a playlist query request to a server based on a preset time interval; or, when detecting a trigger operation of the participant in a singing room, sending a playlist query request to the server.

15. The non-transitory computer-readable storage medium according to claim 13, the computer program, when executed by a processor, further implements the following steps:

obtaining audio data to be tested of a current singer in the singing room, compressing the audio data to be tested to obtain an audio compression package, and uploading the audio compression package to a background; and receiving a singing result of the current singer, and displaying the singing result on the display interface.

* * * * *